United States Patent
Magda et al.

(10) Patent No.: US 11,105,440 B2
(45) Date of Patent: Aug. 31, 2021

(54) VALVE ASSEMBLY

(71) Applicant: Mueller International, LLC, Atlanta, GA (US)

(72) Inventors: Mark Magda, Harrison, TN (US); Harold Thomas Mosley, Ooltewah, TN (US)

(73) Assignee: Mueller International, LLC, Atlanta, GA (US)

( * ) Notice: Subject to any disclaimer, the term of this patent is extended or adjusted under 35 U.S.C. 154(b) by 140 days.

(21) Appl. No.: 16/106,988

(22) Filed: Aug. 21, 2018

(65) Prior Publication Data
US 2020/0063889 A1 Feb. 27, 2020

(51) Int. Cl.
*F16K 37/00* (2006.01)
*F16K 7/12* (2006.01)
*E03B 7/07* (2006.01)

(52) U.S. Cl.
CPC ............. *F16K 37/005* (2013.01); *F16K 7/12* (2013.01); *E03B 7/07* (2013.01); *Y10T 137/776* (2015.04)

(58) Field of Classification Search
CPC ..... Y10T 137/776; F16K 37/005; F16K 7/12; E03B 7/07; G05D 7/0623; G05D 7/0629
USPC .......................................................... 137/487
See application file for complete search history.

(56) References Cited

U.S. PATENT DOCUMENTS

| | | | | | |
|---|---|---|---|---|---|
| 3,823,733 A | * | 7/1974 | DuBois | ..................... | F16K 7/12 137/496 |
| 4,796,651 A | * | 1/1989 | Ginn | ........................ | G01F 1/22 137/487 |
| 5,388,607 A | * | 2/1995 | Ramaker | ............. | F02M 21/0239 137/88 |
| 5,460,196 A | * | 10/1995 | Yonnet | ............... | G05D 16/2095 137/12 |
| 6,568,416 B2 | * | 5/2003 | Tucker | ............... | G05D 16/2053 137/14 |
| 6,776,180 B1 | * | 8/2004 | Yonnet | ............... | G05D 16/2095 137/14 |
| 6,935,363 B2 | * | 8/2005 | Lamont | ................ | G05D 16/163 137/492 |
| 7,318,447 B2 | * | 1/2008 | Law | ...................... | G05D 16/163 137/487.5 |
| 9,665,105 B2 | * | 5/2017 | Someya | ............... | G05D 7/0635 |
| 9,846,440 B2 | * | 12/2017 | Endel | ...................... | F23N 5/003 |
| 2002/0002425 A1 | * | 1/2002 | Dossey | ..................... | G01F 1/44 700/284 |
| 2013/0153062 A1 | * | 6/2013 | Young | ..................... | F23N 1/002 137/557 |
| 2014/0034145 A1 | * | 2/2014 | Burt | ........................ | F24F 11/83 137/59 |
| 2014/0097367 A1 | * | 4/2014 | Burt | .................... | F24D 19/1015 251/129.04 |

(Continued)

*Primary Examiner* — William M McCalister

(74) *Attorney, Agent, or Firm* — Taylor English Duma LLP

(57) ABSTRACT

A water control device includes a valve, the valve including a valve body, the valve body including a first end and a second end, the valve body defining a transmission cavity allowing fluid communication between the first end and the second; a control mechanism located within the transmission cavity, the control mechanism arranged to provide modifiable fluid control within the valve; at least one sensor, the at least one sensor being in fluid communication with the transmission cavity; and at least one remote transmission unit in electronic communication with the sensor.

14 Claims, 7 Drawing Sheets

(56) References Cited

U.S. PATENT DOCUMENTS

| | | | |
|---|---|---|---|
| 2014/0230924 A1* | 8/2014 | Kochan, Jr. | G01F 1/363 |
| | | | 137/487.5 |
| 2017/0145667 A1* | 5/2017 | Gal | E03B 7/072 |

* cited by examiner

VALVE ASSEMBLY

TECHNICAL FIELD

This disclosure relates to water control products. More specifically, this disclosure relates to valves.

BACKGROUND

In municipal water control applications, understanding the impact of pressure within the system can be of paramount importance. Spikes in pressure can result in damage to the water control system, including leaks and pipe breaks. Unsuitable reductions in pressure can result in ground water seeping into the water control system, potentially resulting in contamination of the water control system. As such, for a properly functioning water control system to operate, understanding and maintaining system pressure can be particularly important.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A water control device includes a valve, the valve including a valve body, the valve body including a first end and a second end, the valve body defining a transmission cavity allowing fluid communication between the first end and the second; a control mechanism located within the transmission cavity, the control mechanism arranged to provide modifiable fluid control within the valve; at least one sensor, the at least one sensor being in fluid communication with the transmission cavity; and at least one remote transmission unit (RTU) in electronic communication with the sensor.

A method of adding a water control device to a water control system includes obtaining a water control device, the water control device comprising a valve, the valve comprising: a valve body, the valve body comprising a first end and a second end, the valve body defining a transmission cavity allowing fluid communication between the first end and the second; a control mechanism located within the transmission cavity, the control mechanism arranged to provide modifiable fluid control within the valve; at least one sensor, the at least one sensor being in fluid communication with the transmission cavity; and at least one remote transmission unit (RTU) in electronic communication with the sensor; connecting a first end of the water control device to a piping element of the water control system; and connecting the second end of the water control device to a piping element of the water control system.

A method of monitoring a water control system includes obtaining a signal from a remote transmission unit of a water control device, the signal including data from a sensor, the water control device comprising: a valve, the valve comprising: a valve body, the valve body comprising a first end and a second end, the valve body defining a transmission cavity allowing fluid communication between the first end and the second; a control mechanism located within the transmission cavity, the control mechanism arranged to provide modifiable fluid control within the valve; at least one sensor, the at least one sensor being in fluid communication with the transmission cavity; and at least one remote transmission unit in electronic communication with the sensor; and interpreting the data.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
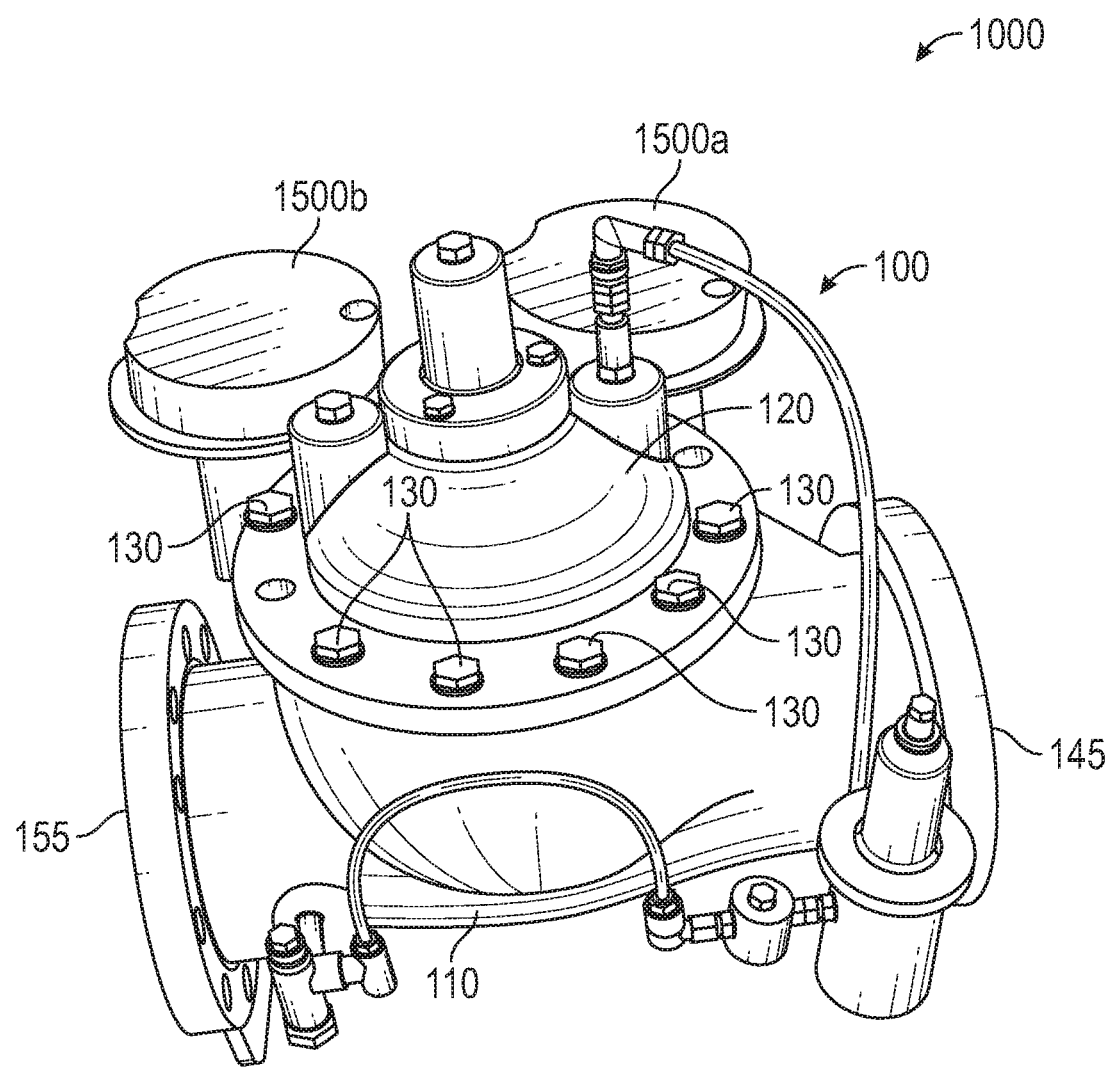
FIG. 1 is a perspective view of a valve assembly in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a valve assembly and associated methods, systems, devices, and various apparatus. It would be understood by one of skill in the art that the disclosed valve assembly is described in but a few exemplary embodiments among many. No particular terminology or description should be considered limiting on the disclosure or the scope of any claims issuing therefrom.

Figure 2:
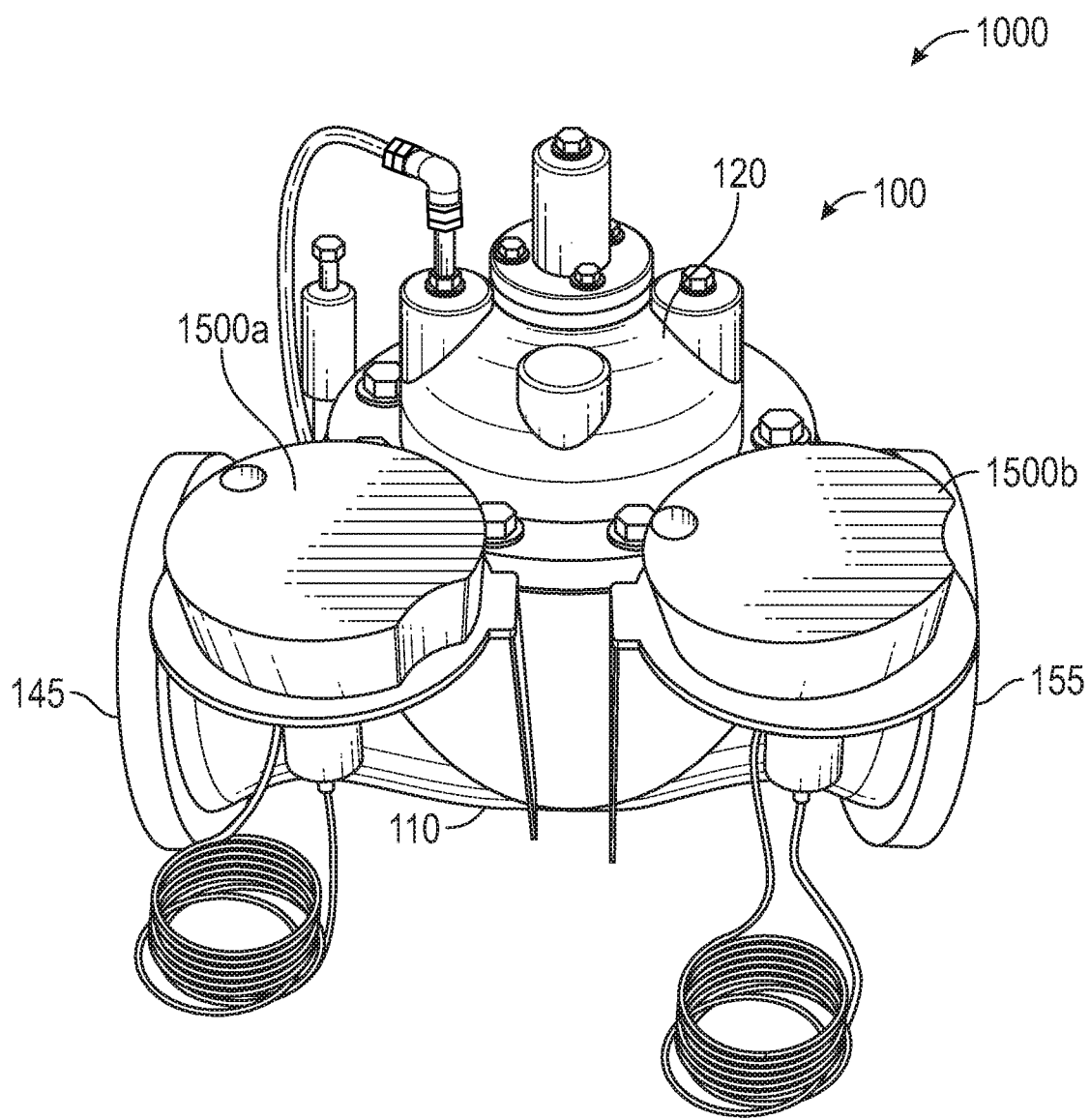
FIG. 2 is an alternate perspective view of the valve assembly of FIG. 1

One embodiment of a valve assembly 1000 is disclosed and described with reference to FIG. 1 and FIG. 2. In the current aspect, the valve assembly 1000 can comprise a valve 100 that can be a pressure control valve such as an automatic diaphragm control valve. In various aspects, a Singer™ Pressure Management Valve, such as Singer™ model 106/206 PR or the like, can be a suitable valve for use in the valve assembly 1000. In various aspects, the valve assembly 1000 can comprise at least one of a plurality of valve types including, but not limited to, gate valves, check valves, pressure reduction valves, pressure maintaining valves, butterfly valves, and other flow control valves, among others. One of skill in the art would understand that the scope of the current disclosure is not limited to any particular valve type.

The valve assembly 1000 can comprise the valve 100 such as the previously cited Singer™ Pressure Management Valve. The valve 100 can comprise a valve body 110. The valve 100 can comprise a bonnet 120 that can be fixedly or releasably secured to the valve body 110 using fasteners 130. In various aspects, the bonnet 120 can be affixed to the valve body 110 using various fasteners such as screws, bolts, welding, adhesives, or various other mechanical fasteners. The valve 100 can define a first end 145 and a second end 155. In various aspects, the first end 145 and second end 155 can each be termed an inlet or an outlet depending on the direction of flow desired through the valve body 110. A pair of remote transmission units (RTUs) 1500*a,b* can be seen attached to the valve 100 as will be discussed in greater detail below. RTUs 1500 of the current aspect can be powered by battery, by solar power, by connection to a land line, or from fluid flow, among other methods. As seen, each RTU 1500 can be mounted to the valve body 110 using a variety of mechanical fasteners, including screws, clips, various adhesives, or various other methods as known to one of skill in the art.

Figure 3:
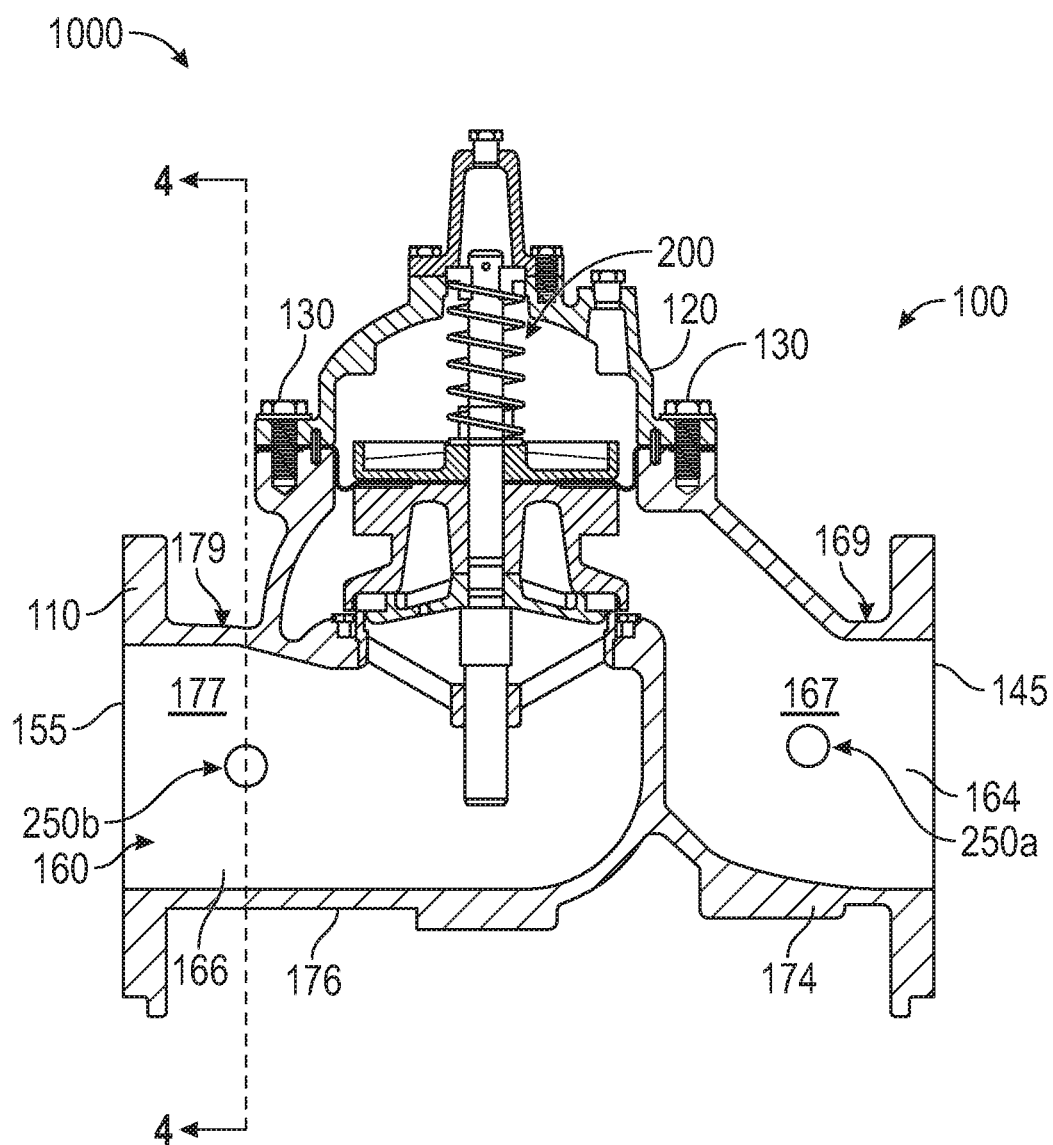
FIG. 3 is a cross-sectional view of a valve of the valve assembly of FIG. 1 taken on a plane through the center of the valve.

As seen with reference to FIG. 3, the valve body 110 can define a transmission cavity 160. The transmission cavity 160 can allow transmission of water between the first end 145 and the second end 155. The valve assembly 1000 can comprise a diaphragm assembly 200 situated between the valve body 110 and the bonnet 120 within the transmission cavity 160. The diaphragm assembly 200 is one of a plurality of control mechanisms that can be arranged within the valve assembly 1000 and can include various types of manual and automatic control mechanisms as would be known to one of skill in the art. The diaphragm assembly 200 can be arranged as a barrier within the transmission cavity 160 and can perform functions to control pressure within the valve assembly 1000 as known in the art.

For reference, the transmission cavity 160 can be defined by a first portion 164 defined as the cavity providing fluid communication between the first end 145 and the diaphragm assembly 200, and the transmission cavity 160 can be defined by a second portion 166 defined as the cavity providing fluid communication between the diaphragm assembly 200 and the second end 155. Similarly, the valve body 110 can be comprised of a wall structure. In the current aspect, the valve body 110 can comprise a first wall structure 174 as the portion of the valve body 110 defining the first portion 164, and the valve body 110 can comprise a second wall structure 176 of the valve body 110 defining the second portion 166. An inner surface 167 and outer surface 169 of the valve body 110 proximate the first wall structure 174 can be seen, and an inner surface 177 and outer surface 179 of the valve body 110 proximate the second wall structure 176 can be seen. A pair of ports 250a,b can be defined in the valve body 110. Each port 250 can be an aperture in each of the first and second wall structures 174,176 that can allow fluid communication between an exterior of the valve body 110 and the transmission cavity 160.

Figure 4A:
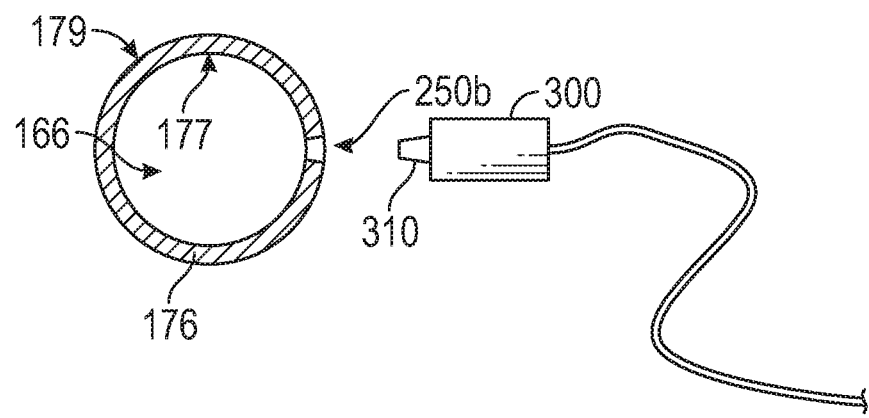
FIG. 4A is a cross-sectional view of a valve body of the valve of FIG. 3 taken along the plane indicated by line 4-4 in FIG. 3 with a sensor introduced.
Figure 4B:
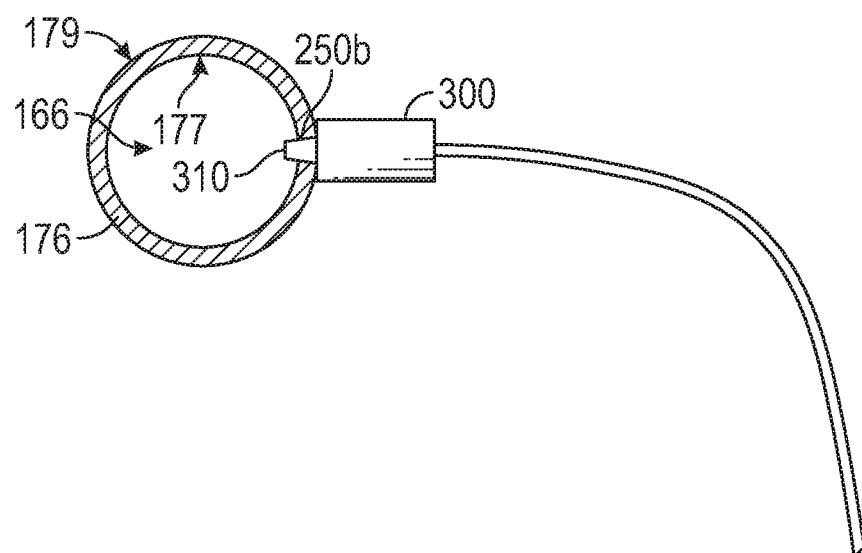
FIG. 4B is the cross-sectional view of FIG. 4A with the sensor assembled to the valve.

With reference to FIGS. 4A-4B, the port 250b (which can also represent the port 250a as understood by one of skill in the art) can have a tapered arrangement such that a portion of the port 250b along the inner surface 177 can be smaller in diameter than the portion of the port 250b along the outer surface 179. The port 250b can be threaded to allow threaded connection of a device. In various aspects, the port 250b can be arranged with various fastening mechanisms, including various fasteners such as screws, bolts, glues, adhesives, welding, or other types of connection or joining mechanisms. In the current aspect, a sensor 300 can be connected to the valve body 110 (shown in FIG. 1) along the port 250b by threaded engagement of a threaded end 310 of the sensor 300 inserted into and engaged with the port 250b. In such an arrangement, the sensor 300 can detect features of the fluid within the valve body 110 when in use. The sensor 300 can be a pressure sensor in various applications. In various applications, additional sensor types can be utilized, including flow sensors, temperature sensors, water quality sensors, contaminant sensors, or various other types as known and understood by one of skill in the art.

As seen with additional reference to FIG. 3 and FIGS. 4A-4B, one sensor 300 can be arranged within each port 250a,b. As such, the sensors 300 within each port 250a,b can measure aspects of the fluid both before and after passing through the diaphragm assembly 200. As such, aspects of the municipal water supplies—including, but not limited to, water pressure—can be measured at varying points in the line. The inclusion of multiple measurement points can provide additional data that can provide strategic advantages. For example, monitoring inlet and outlet pressures can help determine if the control valve is functioning correctly; can help determine line breakages by communicating sudden pressure drops and relative pressure variations on each side of the valve 100; can indicate a control failure or maintenance needed when pressure variants are not as expected within the system based on control aspects; and, can alarm interested parties (such as municipal control systems or stakeholders) when pressure is outside of expected or required ranges, among other valuable benefits. Further, because the valve assembly 1000 can be provided to the municipality with sensors 300, sensor ports 250, and RTUs 1500, the valve assembly 1000 can provide an in-situ solution that can be easily and readily interchanged with control valves already within the system.

Figure 5A:
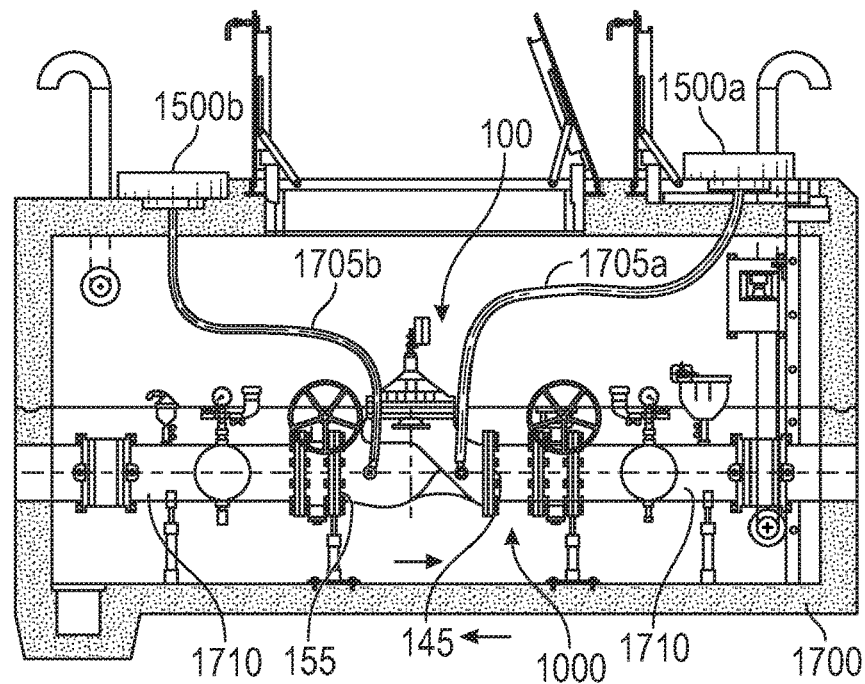
FIG. 5A is a side cutaway view of a water control assembly in accord with one aspect of the current disclosure, the water control assembly including the valve assembly of FIG. 1.
Figure 5B:
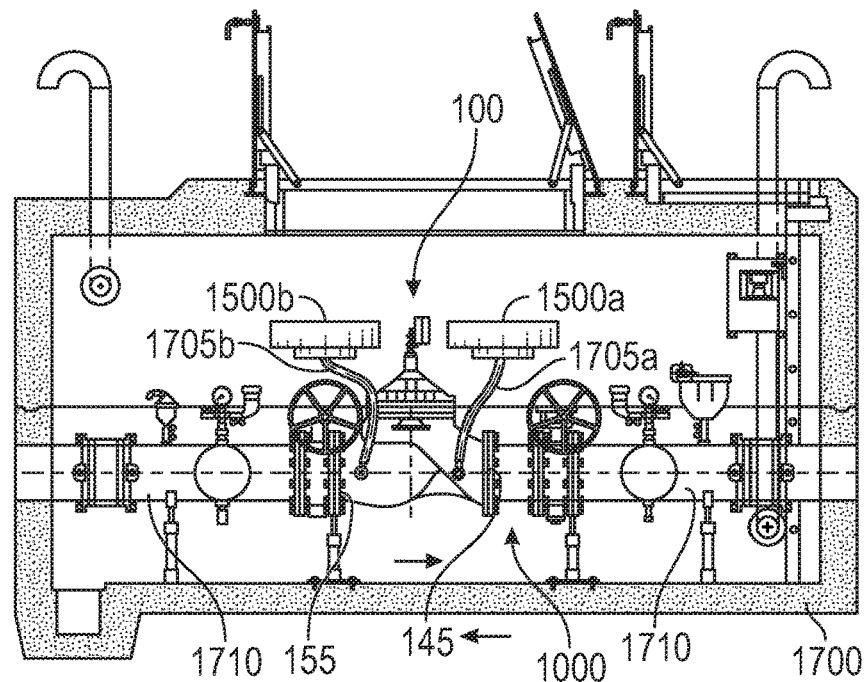
FIG. 5B is a side cutaway view of an alternate arrangement of the water control assembly of FIG. 5A.
Figure 5C:
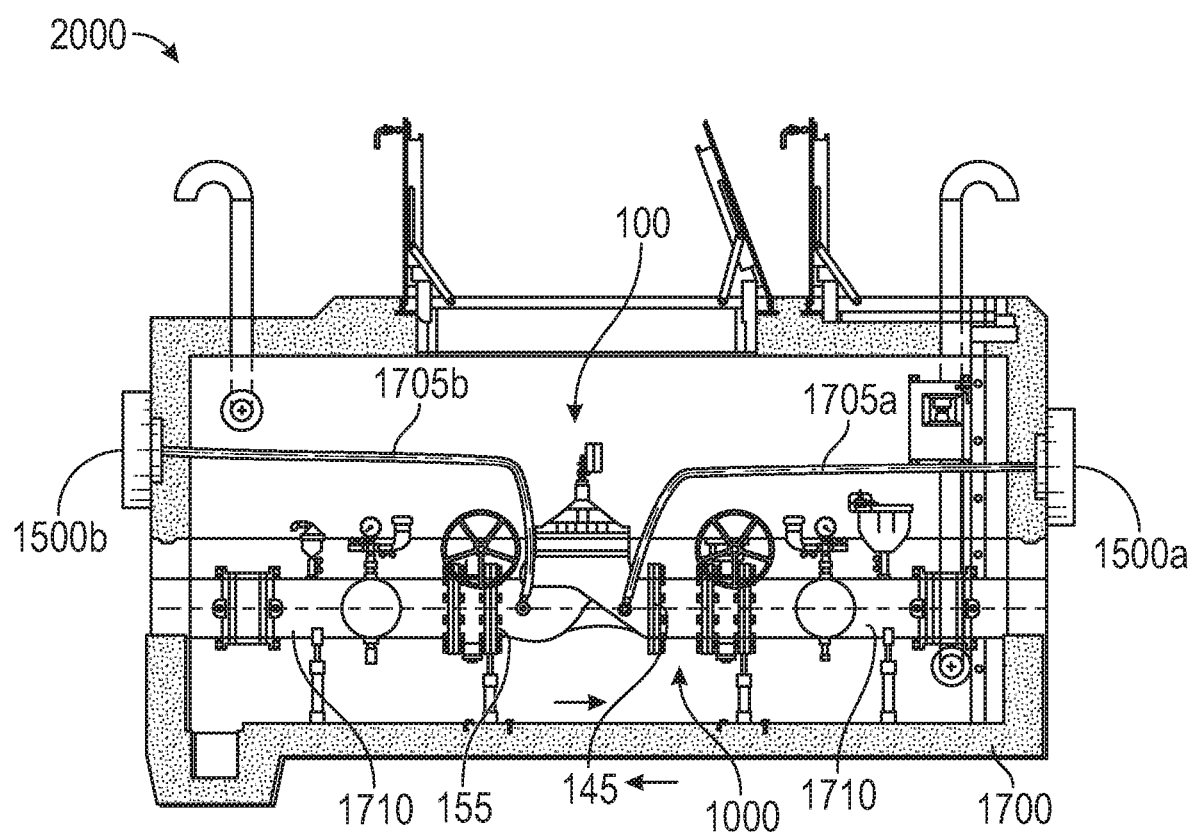
FIG. 5C is a side cutaway view of an alternate arrangement of the water control assembly of FIG. 5A.

As seen with reference to FIGS. 5A-5C, the valve assembly 1000 can be included within a chamber 1700 that can be arranged within the ground. Piping elements 1710 can connect to the first and second ends 145,155 of the valve 100 to provide fluid communication between the valve assembly 1000 and the piping system. The piping elements 1710 can arranged through the walls of the chamber 1700. The chamber 1700 can provide separation of the valve 100 from the ground in which the valve assembly 1000 can be buried. Together, the valve 100, any RTUs 1500, and the chamber 1700 can be termed a water control assembly 2000. In the current aspect, each RTU 1500a,b can be attached to or in electrical connection with the valve 100 and/or at least one sensor 300 (as shown in FIG. 3) by leads 1705a,b. The RTUs 1500a,b can be located at locations within the chamber 1700 that are remote to the valve 100 as seen. For example, with reference to FIG. 5A, the RTUs 1500a,b can be located along an upper end of the chamber 1700. With reference to FIG. 5B, the RTUs 1500a,b can be affixed within the chamber 1700 but apart from the valve 100. With reference to FIG. 5C, the RTUs 1500a,b can be located along sides of the chamber 1700. The RTUs 1500a,b can be located within the chamber 1700 or can be located outside of the chamber 1700 with the leads 1705a,b penetrating a wall of the chamber 1700.

Figure 6:
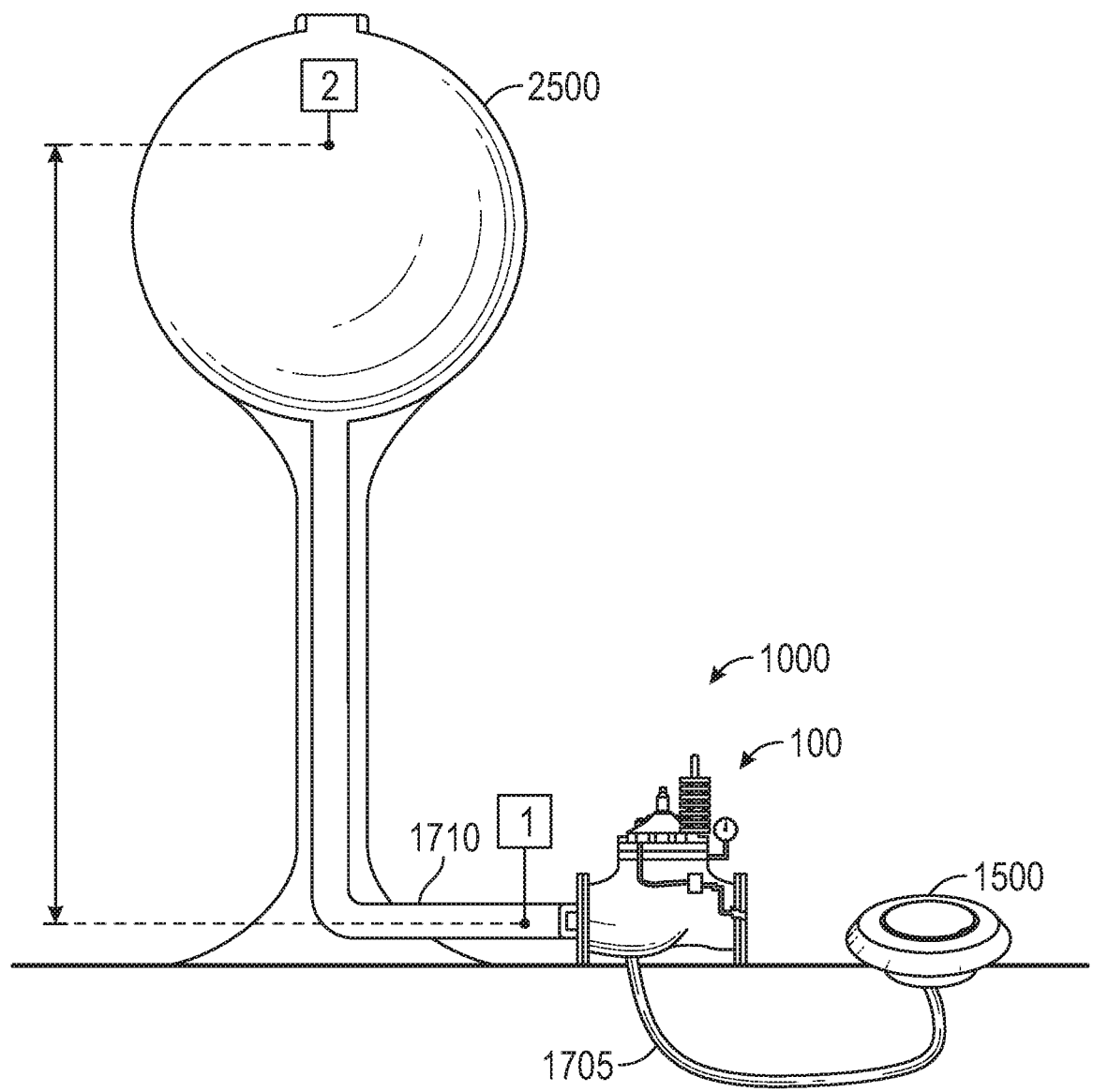
FIG. 6 is a plan view of a water control system in accord with one aspect of the current disclosure including the valve assembly of FIG. 1.

Another application of the valve assembly 1000 can be seen with reference to FIG. 6. The valve assembly 1000 can be connected to a water tower 2500. As previously referenced, the valve assembly 1000 can be connected between the water tower 2500 and a municipal piping system. The valve assembly 1000 can be connected to the water tower 2500 by piping elements such as piping element 1710.

As cited herein, the RTU 1500 can be a cellular communicator, among other methods. In various aspects, the RTU 1500 can be Wi-Fi enabled, Bluetooth enabled, or enabled for various other near-field communication methods. In application, the RTU 1500 can be arranged to communicate with a distributed control system or a SCADA system using telemetry. In various applications, communication of data by the RTU 1500 can be passed along cellular networks to remote municipalities, to email networks, to an interested party's cellular phone, or to an automated control system.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible That which is claimed is:

1. A water control device comprising:
an automatic diaphragm control valve, the valve comprising:
a valve body, the valve body comprising a first end and a second end, the valve body defining a transmission cavity allowing fluid communication between the first end and the second;
a control mechanism located within the transmission cavity, the control mechanism being an automatic diaphragm control, the control mechanism arranged to provide modifiable fluid control within the valve;
two sensors, each sensor being in fluid communication with the transmission cavity; and
at least one remote transmission unit (RTU) in electronic communication with the sensors,
wherein the transmission cavity comprises a first portion located on one side of the control mechanism and a second portion located on another side of the control mechanism, wherein the first sensor is in fluid communication with the first portion and the second sensor is in fluid communication with the second portion,
wherein a first port is defined in the valve body allowing fluid communication with the first portion, the first port being tapered such that a first end of the first port is of a smaller diameter than a second end of the first port,
wherein a second port is defined in the valve body allowing fluid communication with the second portion, the second port being tapered such that a first end of the second port is of a smaller diameter than a second end of the second port,
wherein the first sensor is arranged within the first port and the second sensor is arranged within the second port,
wherein one sensor is tapered along a threaded portion to match the taper of the first port, and
wherein the other sensor is tapered along a threaded portion to match the taper of the second port.

2. The water control device of claim 1, wherein each sensor is a pressure sensor.

3. The water control device of claim 1, wherein the control mechanism is a diaphragm assembly.

4. The water control device of claim 1, wherein the valve and each sensor are located within a chamber and wherein each RTU is connected to one sensor by a lead.

5. The water control device of claim 4, wherein the RTU is affixed to an exterior wall of the chamber.

6. A method of adding a water control device to a water control system, the method comprising:
obtaining a water control device, the water control device comprising
an automatic diaphragm control valve, the valve comprising:
a valve body, the valve body comprising a first end and a second end, the valve body defining a transmission cavity allowing fluid communication between the first end and the second;
a control mechanism located within the transmission cavity, the control mechanism being an automatic diaphragm control, the control mechanism arranged to provide modifiable fluid control within the valve;
two sensors, each sensor being in fluid communication with the transmission cavity; and
at least one remote transmission unit (RTU) in electronic communication with the sensors;
connecting a first end of the water control device to a piping element of the water control system; and
connecting the second end of the water control device to a piping element of the water control system,
wherein the transmission cavity comprises a first portion located on one side of the control mechanism and a second portion located on another side of the control mechanism, wherein the first sensor is in fluid communication with the first portion and the second sensor is in fluid communication with the second portion,
wherein a first port is defined in the valve body allowing fluid communication with the first portion, the first port being tapered such that a first end of the first port is of a smaller diameter than a second end of the first port,
wherein a second port is defined in the valve body allowing fluid communication with the second portion, the second port being tapered such that a first end of the second port is of a smaller diameter than a second end of the second port,
wherein the first sensor is arranged within the first port and the second sensor is arranged within the second port,
wherein one sensor is tapered along a threaded portion to match the taper of the first port, and wherein the other sensor is tapered along a threaded portion to match the taper of the second port.

7. The method of claim 6, wherein each sensor is a pressure sensor.

8. The method of claim 6, wherein the control mechanism is a diaphragm assembly.

9. The method of claim 6, wherein the valve and each sensor are located within a chamber and wherein each RTU is connected to one sensor by a lead.

10. The method of claim 9, wherein the RTU is affixed to an exterior wall of the chamber.

11. A method of monitoring a water control system, the method comprising:
obtaining a signal from a remote transmission unit of a water control device, the signal including data from two sensors of the water control device, the water control device comprising:
an automatic diaphragm control valve, the valve comprising:
a valve body, the valve body comprising a first end and a second end, the valve body defining a transmission cavity allowing fluid communication between the first end and the second;
a control mechanism located within the transmission cavity, the control mechanism being an automatic diaphragm control, the control mechanism arranged to provide modifiable fluid control within the valve;
the two sensors, wherein each sensor is in fluid communication with the transmission cavity; and
at least one remote transmission unit in electronic communication with each sensor,
wherein the transmission cavity comprises a first portion located on one side of the control mechanism and a second portion located on another side of the control mechanism, wherein the first sensor is in fluid communication with the first portion and the second sensor is in fluid communication with the second portion,
wherein a first port is defined in the valve body allowing fluid communication with the first portion, the first port being tapered such that a first end of the first port is of a smaller diameter than a second end of the first port, wherein a second port is defined in the valve body allowing fluid communication with the second portion, the second port being tapered such that a first end of the second port is of a smaller diameter than a second end of the second port, wherein the first sensor is arranged within the first port and the second sensor is arranged within the second port, wherein one sensor is tapered along a threaded portion to match the taper of the first port, and wherein the other sensor is tapered along a threaded portion to match the taper of the second port; and interpreting the data.

12. The method of claim 11, wherein the signal is a distress signal.

13. The method of claim 11, further comprising the step of taking action based on the data.

14. The method of claim 13, wherein the action taken is a repair to the water control system.

* * * * *